US005088517A

United States Patent [19]

Bersch

[11] Patent Number: 5,088,517

[45] Date of Patent: Feb. 18, 1992

[54] APPARATUS FOR ADMITTING FLOWABLE ADDITIVE TO A LIQUID

[76] Inventor: Friedrich Bersch, Industriestrasse 18, W-5401 Halsenbach, Fed. Rep. of Germany

[21] Appl. No.: 679,750

[22] Filed: Apr. 3, 1991

[30] Foreign Application Priority Data

Apr. 5, 1990 [DE] Fed. Rep. of Germany ....... 4010962
Nov. 13, 1990 [DE] Fed. Rep. of Germany ....... 4036083

[51] Int. Cl.[5] .............................................. G05D 11/00

[52] U.S. Cl. ............................ 137/101.11; 137/564.5; 222/162

[58] Field of Search ......................... 137/101.11, 564.5; 222/162, 309, 373, 383

[56] References Cited

U.S. PATENT DOCUMENTS

| | | | |
|---|---|---|---|
| 2,217,750 | 10/1940 | Hockenstrom | 222/162 X |
| 3,200,840 | 8/1965 | Watts | 136/564.5 |
| 4,358,056 | 11/1982 | Greenhut | 222/162 X |
| 4,399,932 | 8/1983 | Zimmermann | 222/383 X |
| 4,607,410 | 8/1986 | Bersch | 15/3.51 |
| 4,823,818 | 4/1989 | De Buyer | 134/95 |
| 4,955,100 | 9/1990 | Bersch | 15/3.51 |

FOREIGN PATENT DOCUMENTS

| | | |
|---|---|---|
| 0184333 | 6/1986 | European Pat. Off. . |
| 2611493 | 9/1977 | Fed. Rep. of Germany . |
| 3320293 | 12/1984 | Fed. Rep. of Germany . |
| 3347003 | 7/1985 | Fed. Rep. of Germany . |

OTHER PUBLICATIONS

Pamphlet, Reinigungsapparat "Fasil", Feb. 1954.

*Primary Examiner*—Robert G. Nilson
*Attorney, Agent, or Firm*—Peter K. Kontler

[57] ABSTRACT

An apparatus for admitting metered quantities of a flowable additive into a liquid stream has a horizontal metering cylinder which is surrounded by a connector supporting a vessel for a supply of additive. The additive is free to flow into the cylinder when the connector is turned about the cylinder to move the vessel to a higher level, and the vessel is sealed from the interior of the cylinder when the connector is turned to a different position in order to lower the vessel. A manually operated or fluid operated piston is provided in the cylinder to expel a metered quantity of additive into a conduit which supplies a stream of tap water or another cleaning liquid to a shuttle valve forming part of an apparatus for cleaning pipelines in breweries, bars and similar establishments.

36 Claims, 7 Drawing Sheets

Fig. 4
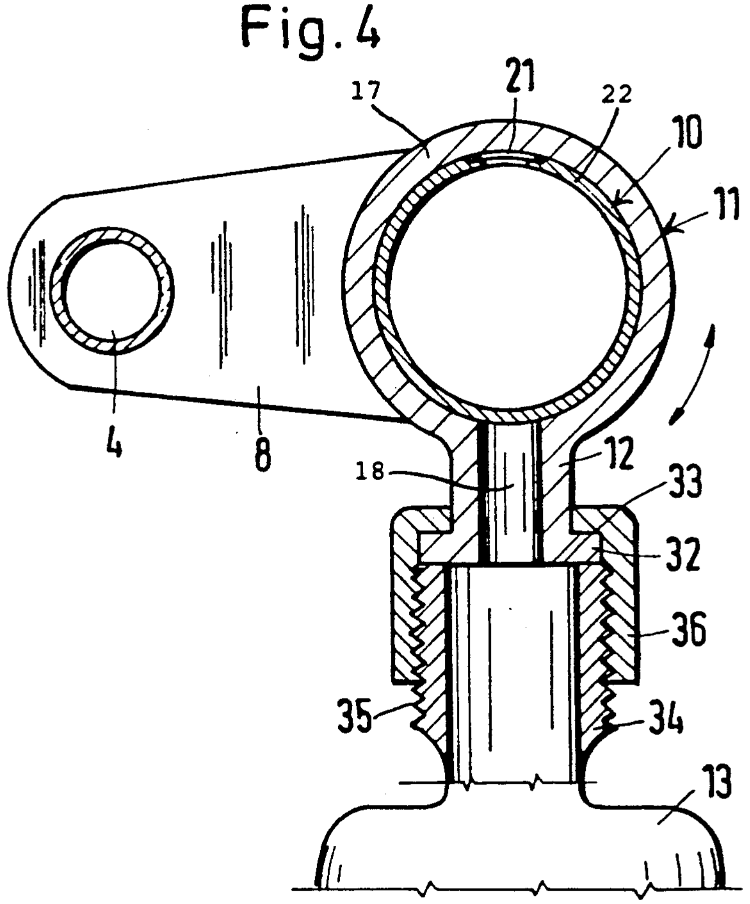
Fig. 3
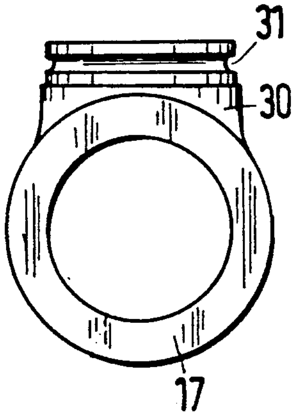
Fig. 6
Fig. 5
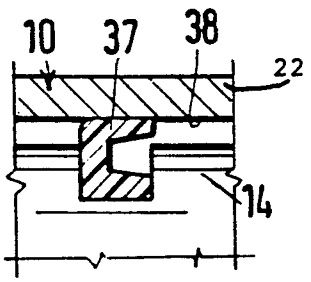
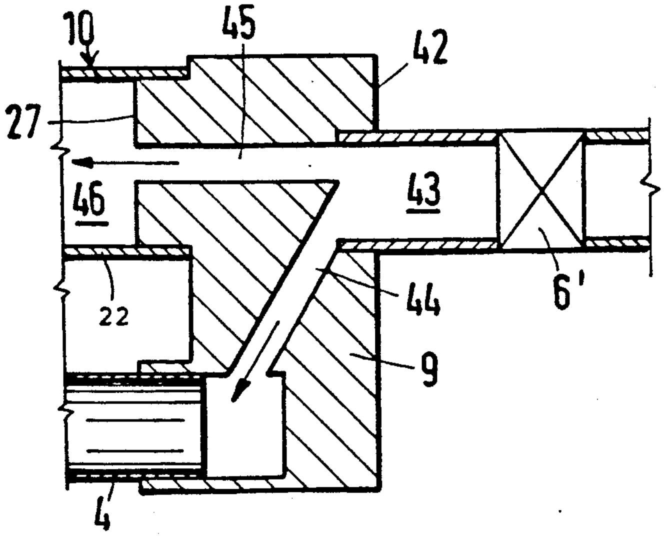

APPARATUS FOR ADMITTING FLOWABLE ADDITIVE TO A LIQUID

BACKGROUND OF THE INVENTION

The invention relates to apparatus for metering and dispensing flowable materials, and more particularly to improvements in apparatus for admitting metered quantities of one or more flowable additives to a stream of water or another liquid.

It is known to equip a metering apparatus with a cylinder which receives a flowable additive from a vessel and contains a piston which is used to expel additive from the cylinder into a conduit for a stream of a hydraulic fluid. The channel which connects the vessel with the cylinder is sealed when the transfer of a selected quantity of additive into the cylinder is completed and remains sealed thereafter prior to renewed actuation of the piston to expel additive from the cylinder.

Metering apparatus of the above outlined character are used for admission of an additive (e.g., a comminuted solid, liquid or gaseous disinfectant, an alkaline cleaning solution or an acid) into tap water or another cleaning fluid which is to be conveyed through one or more pipelines for beer or other beverages. Apparatus which can be used to clean pipelines in restaurants, bars and/or other beverage dispensing establishments normally employ shuttle valves of the type disclosed, for example, in commonly owned U.S. Pat. Nos. 4,607,410 and 4,955,100. The disclosures of these patents are incorporated herein by reference. In many instances, the cleaning liquid is tap water which is admitted into the shuttle valve for repeated circulation through one or more pipelines which require cleaning. Spent tap water is discharged through an outlet of the shuttle valve. The effectiveness of tap water as a cleaning agent can be greatly enhanced if the water is mixed with a metered quantity of a suitable soluble or insoluble additive, e.g., a detergent, a disinfectant or any other substance which can but need not be partly or fully dissolved in tap water and is conveyed through the pipeline or pipelines prior to leaving the cleaning apparatus by way of the outlet of the shuttle valve.

An apparatus which can be used to admit metered quantities of a suitable additive to tap water or another cleaning liquid is described and shown in commonly owned published German patent application No. 33 20 293 A 1. The metering apparatus is combined with a cleaning apparatus which can be of the type described in U.S. Pat. No. 4,607,410, and the metering apparatus comprises a stationary vessel which contains a supply of flowable additive and is installed at a level above a stationary metering cylinder. A flow regulating valve is provided to admit additive from the vessel into the cylinder, and such additive is expelled from the cylinder by a reciprocable piston to be admitted into a conduit which conveys a stream of cleaning liquid to the inlet of the shuttle valve. A drawback of the metering apparatus which is described in the published German patent application is that, if the seat and/or the valving element of the flow regulating valve between the vessel and the cylinder is contaminated, the cylinder continuously receives a trickle or a larger flow of additive so that the percentage of additive in the cleaning liquid rises above an optimum or permissible value. The German patent application does not describe and/or show any controls for the flow regulating valve between the vessel and the cylinder. The vessel must be refilled from time to time with attendant danger of admission of contaminants into the supply of additive therein. Furthermore, refilling of the vessel is a dangerous undertaking if the additive is a strongly acidic, caustic or other aggressive substance. It has been found that the just described metering apparatus is incapable of invariably ensuring the admission of accurately metered additives and that the degree of automation of the additive admitting operation is insufficient.

U.S. Pat. No. 4,823,818 to De Buyer discloses a dispensing device for washing products. The patented device includes manually operated means for injecting a given quantity of washing products into the container of a dishwasher at the start of a washing operation. A regulating device is provided to admit washing products during a washing cycle; such regulating device is activated in response to closing of a door or cover for the container of the dishwasher.

Published German patent application No. 26 11 493 A 1 of Provera GmbH discloses a liquid metering apparatus wherein the piston of a cylinder and piston unit is biased to one end position by a spring in order to draw a metered quantity of a liquid from a vessel. A hydraulic fluid is used to move the piston in the opposite direction so that the fluid-propelled piston expels the metered quantity of liquid into a consumer.

Commonly owned published German patent application No. 33 47 003 A1 describes a cleaning apparatus which employs a shuttle valve of the type described and shown in commonly owned U.S. Pat. No. 4,607,410. The shuttle valve forms part of a module which further comprises a pump and a motor as well as a storing facility for sponge-like cleaning elements.

Published European patent application No. 0 184 333 of Nystuen describes a volumetric gravity feed liquid dispenser which can be used in conjunction with a dishwashing rack to deliver a liquid detergent or in conjunction with a water closet to discharge a deoderant and/or cleaning liquid.

German-language pamphlet entitled "Reinigungsapparat 'Fasil'" describes a cleaning apparatus which can be used in breweries and similar establishments. The pamphlet suggests to use a pump or a pressure regulator in order to clean pipes or hoses with a solvent.

OBJECTS OF THE INVENTION

An object of the invention is to provide a metering apparatus which is simpler, more compact and more reliable than heretofore known metering apparatus.

Another object of the invention is to provide an apparatus which can reliably prevent leakage of a flowable additive into a liquid stream at a time when such leakage is unnecessary and/or dangerous.

A further object of the invention is to provide the metering apparatus with novel and improved means for admitting metered quantities of a flowable additive into and for evacuating the thus admitted additive from a metering cylinder.

An additional object of the invention is to provide the apparatus with novel and improved means for repeatedly delivering identical metered quantities of a flowable additive into the metering cylinder.

Still another object of the invention is to provide the apparatus with novel and improved means for supporting a vessel which confines a supply of flowable additive.

A further object of the invention is to provide an apparatus wherein the source of flowable additive is readily accessible for replenishment with a supply of additive.

Another object of the invention is to provide a novel and improved combination of additive metering and pipeline cleaning apparatus.

An additional object of the invention is to provide an apparatus wherein the expulsion of metered quantities of a flowable additive from the metering cylinder can be carried out in any one of several different ways.

A further object of the invention is to provide an apparatus which is constructed and assembled in such a way that it permits visual determination of the quantity of flowable additive in the metering cylinder at any stage of the cylinder filling or emptying operation.

Another object of the invention is to provide the apparatus with novel and improved means for regulating the flow of additive to and/or from the metering cylinder.

SUMMARY OF THE INVENTION

The invention is embodied in an apparatus for admitting metered quantities of a flowable additive (e.g., a disinfectant) into a receiver, e.g., into a device which can be used to clean pipelines for beverages or the like. The apparatus comprises an elongated metering cylinder having at least one opening (first opening) and a first channel, an additive-containing vessel, a connector which defines a second channel for reception of additive from the vessel and is movable with the vessel between a first position in which the vessel is located at a first level and the second channel admits additive into the cylinder by way of the first opening, and a second position in which the vessel is located at a second level below the first level and is sealed from the cylinder, and means for expelling additive from the cylinder by way of the first channel.

The connector and the vessel are preferably turnable between the first and second positions, most preferably about a substantially horizontal axis. Such axis can be defined by the cylinder.

The connector can be provided with means (e.g., an internal surface or an end face) for sealing the second channel from the first opening in the second position of the connector and vessel.

A check valve can be provided in the first channel to prevent return flow of additive into the cylinder and/or a check valve can be provided in the second cahnnel to prevent return flow of additive from the cylinder toward the vessel.

The connector can be provided with an aerating channel which is sealed in the first position of the connector and vessel but connects the interior of the vessel with the atmosphere in response to movement of the connector and vessel away from the first position (e.g., to the second position and/or to an intermediate position between the first and second positions).

The apparatus can be provided with means (e.g., a threaded nipple on a sleeve-like component of the connector) for mechanically coupling the vessel with the connector. The sleeve-like component can be mounted in such a way that it surrounds the cylinder. The coupling means can be separably secured to the connector so that it can be replaced with different coupling means, for example, in order to couple the connector with a different vessel.

The cylinder is formed with a compartment for additive, and this compartment communicates with the first opening. Such cylinder can be further provided with a second opening which communicates with the first channel, and the two openings are spaced apart from each other in the longitudinal direction of the cylinder. The sleeve-like component of the connector can be rotatably mounted on the cylinder to surround the two openings. Such sleeve-like component is provided with a third channel (e.g., an axially parallel groove in the cylindrical internal surface of the sleeve-like component) which connects the two openings in the second position of the connector and vessel so that a metered quantity of additive can be expelled from the compartment by way of the first opening, third channel, second opening and first channel. The arrangement is preferably such that the second channel registers with the first opening in the first position of the connector and vessel to admit additive into the compartment of the cylinder. The second channel can be located substantially diametrically opposite the first opening in the second position of the connector and vessel.

At least a portion of the cylinder can be made of a light transmitting (transparent or translucent) material.

The expelling means can comprise a fluid-operated piston which is reciprocably mounted in the cylinder for movement in a first direction (expulsion of additive from the compartment by way of the first channel) and in a second direction counter to the first direction. The expelling means can further comprise a source of pressurized fluid (e.g., a source of tap water) and means for admitting pressurized fluid from the source into one end of the cylinder to thereby move the piston in the first direction. The receiver can be connected with the source by way of a conduit, and the fluid admitting means can be provided with a passage which connects the conduit with the one end of the cylinder. The first channel can discharge additive into the conduit downstream of the passage (as considered in the direction of fluid flow from its source toward the receiver). The piston can comprise a piston rod which extends from the cylinder and can be manipulated by hand to move the piston in the first direction and/or in the second direction. The apparatus can further comprise one or more springs or other suitable means for biasing the piston in the second direction. Such biasing means can be provided in addition to or in lieu of the piston rod.

The apparatus can comprise means for limiting the stroke of the piston in the cylinder. The limiting means is preferably adjustable to select the stroke of the piston in the cylinder. Such adjustable limiting means can comprise an adjustable stop on the piston rod.

The apparatus can also comprise means for indicating the quantity of additive in the cylinder. Such indicating means can comprise at least one scale which is provided on or adjacent the cylinder. If the cylinder transmits light, the piston can be used as a pointer to move along the scale and to pinpoint the quantity of additive in the compartment of the cylinder.

The aforementioned conduit can be said to form part of the receiver. The cylinder preferably comprises or is mounted in first and second supports which connect the cylinder with the conduit. The first channel is or can be provided in the first support and can serve to convey additive from the internal compartment of the cylinder into the conduit. The two supports are or can be at least substantially identical. The aforementioned passage for admission of pressurized fluid (such as tap water) into one end of the cylinder can be provided in the second support. The passage can admit to the cylinder pressurized fluid from the conduit and/or from the source. An adjustable flow restrictor can be provided in the passage to regulate the rate of fluid flow into the one end of the cylinder.

In addition to a source of pressurized hydraulic fluid (such as tap water), the apparatus can further comprise a (second) source of compressed gas (e.g., carbon dioxide gas). Such second source forms part of the expelling means. Means can be provided to connect the second source with the one end of the cylinder in lieu of with the source of pressurized hydraulic fluid so that the piston is then moved in the first direction by compressed gas which is supplied by the second source. The aforementioned adjustable flow restrictor in the passage of the second support can be used as a means for sealing the cylinder from the source of pressurized hydraulic fluid when the piston is to be moved by compressed gas or vice versa.

The receiver can further comprise a shuttle valve or another suitable valve, and the first support can carry or embody means for connecting the conduit with such valve.

The flow restrictor in the first channel is preferably adjustable to permit a regulation of the rate of flow of additive from the compartment of the cylinder into the conduit or into another part of the receiver.

In accordance with a presently preferred embodiment, the improved apparatus is used to admit metered quantities of a suitable additive (such as a disinfectant) to a receiver which comprises a source of cleaning fluid (such as pressurized tap water), a shuttle valve, a conduit which connects the source with an inlet of the shuttle valve, and means for connecting the shuttle valve with a device to be cleaned, e.g., a system for conveying beer or another beverage from one or more barrels in the basement of a restaurant, pub or another beverage selling establishment to a bar at or above the ground floor level. The first channel can be arranged to admit additive into the conduit or directly into the valve. The connecting means can comprise a pipeline with first and second ends connected to the valve and each capable of receiving cleaning fluid which is supplied by the conduit. The valve can be further provided with an outlet for spent cleaning fluid.

In accordance with one presently preferred embodiment, the first channel includes a first section and a second section and the connector has a second opening which communicates with the second channel and admits additive into the internal compartment of the cylinder by way of the first opening in the first position of the connector and vessel. The connector further comprises a third opening which communicates with the first section of the first channel and is communicatively connected with the first opening in the second position of the connector and vessel, and a fourth opening which is preferably provided in an end face of the connector and communicates with the first section of the first channel. The aforementioned first support for, or of, the cylinder seals the fourth opening in the first position of the connector and vessel. The second section of the first channel is provided in the support and the latter has a fifth opening which communicates with the second section of the first channel and is communicatively connected with the fourth opening in the second position of the connector and vessel. The first and second openings are or can be located substantially diametrically opposite each other (with reference to the axis of the cylinder) in the second position of the connector and vessel. An end face of the support is preferably adjacent the end face of the connector to seal the fourth opening in the first position of the connector and vessel, and the fifth opening is preferably provided in the end face of the support. The end face of the connector can be provided with a sixth opening which communicates with the second channel. The end face of the support is then provided with a seventh opening which is or can be permanently connected with the atmosphere and is communicatively connected with the sixth opening when the connector leaves the first position (e.g., when the connector assumes the second position or an intermediate position between the first and second positions).

The novel features which are considered as characteristic of the invention are set forth in particular in the appended claims. The improved metering apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 3 is an end elevational view (as seen in the direction of arrow III in FIG. 2) of a sleeve-like component which forms part of the connector in the metering apparatus of FIG. 2;

FIG. 4 is an enlarged fragmentary transverse vertical sectional view of a second metering apparatus, showing a different positioning of the metering cylinder and a conduit of the receiver relative to each other and further showing different means for detachably coupling a vessel for a supply of additive with a connector on the metering cylinder;

FIG. 5 is a fragmentary axial sectional view of the metering cylinder and of a different piston in the cylinder;

FIG. 6 is a fragmentary axial sectional view of an additional metering apparatus wherein the connection between a source of cleaning liquid and the metering cylinder is established in a different way;

DESCRIPTION OF PREFERRED EMBODIMENTS

Figure 1:
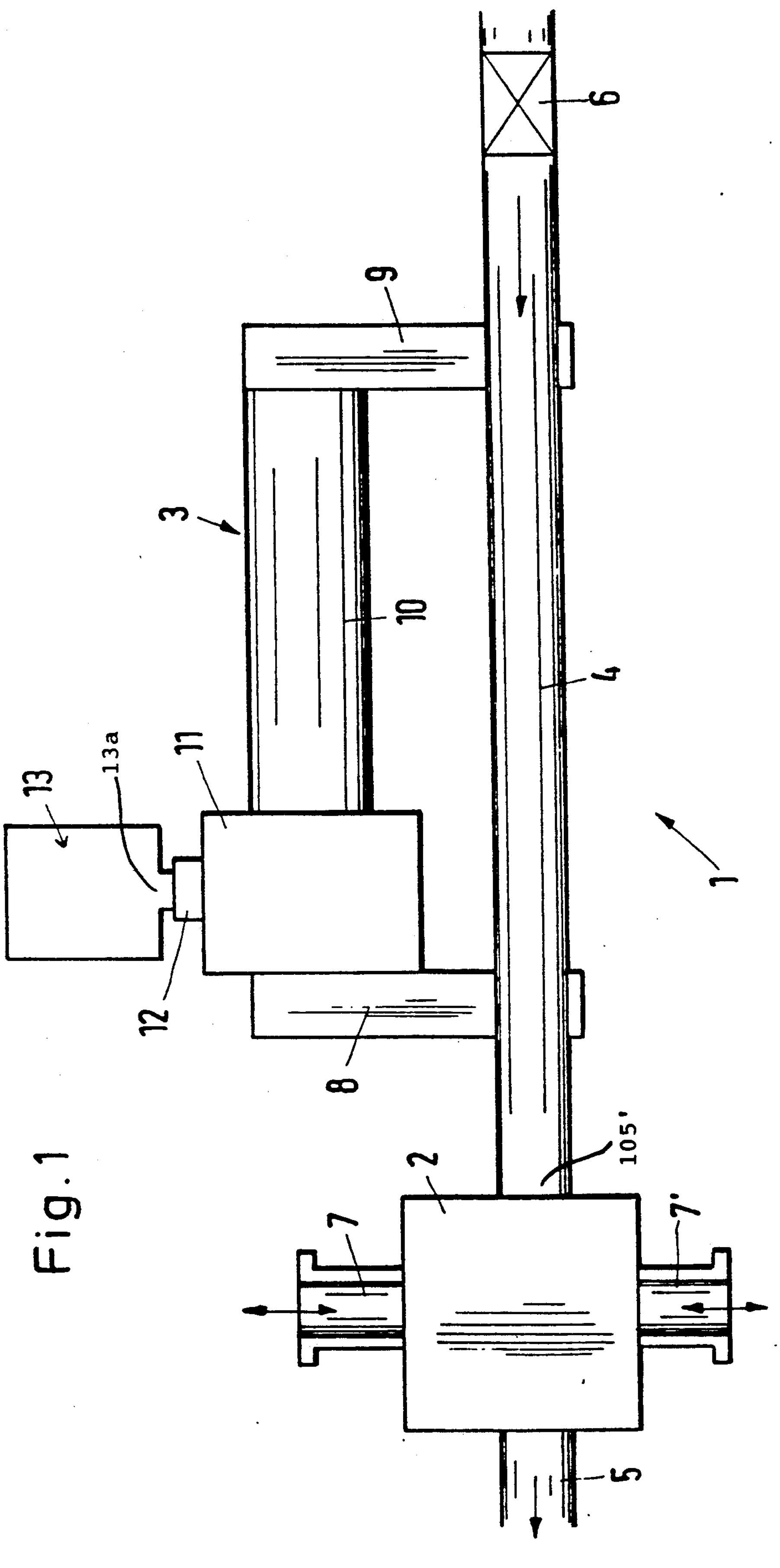
FIG. 1 is a schematic elevational view of a metering apparatus which embodies one form of the invention and is assembled with a receiver forming part of an apparatus for cleaning pipelines in breweries, restaurants and similar establishments, the connector and the vessel for a supply of flowable additive being shown in their first positions.

The apparatus 1 which is shown in FIG. 1 can be used to admit metered quantities of a flowable additive into a conduit 4 which forms part of a receiver. The receiver further includes a shuttle valve 2 and forms part of a cleaning apparatus, e.g., an apparatus of the type described in the aforementioned commonly owned U.S. Pat. No. 4,955,100. The valve 2 comprises an inlet 105' for reception of a cleaning liquid (e.g., tap water) from the conduit 4, an outlet 5 for spent cleaning liquid, and two adapters 7, 7' for attachment to the end portions of a pipeline (not shown) which requires cleaning. The source 6 of cleaning liquid (tap water) is a tap which can be opened to admit pressurized tap water into the respective end of the conduit 4. The valve 2 preferably operates with cleaning elements (e.g., spheres of sponge-like material) which are caused to shuttle in the pipeline back and forth from the adapter 7 to the adapter 7', thereupon from the adapter 7' to the adapter 7 and so forth until the pipeline is clean. The inlet 105' is connected with the adapter 7 so that the stream of pressurized tap water can propel the cleaning elements from the adapter 7, through the pipeline and on to the adapter 7'; at such time, the cleaning elements reverse the flow of water by connecting the inlet 105' with the adapter 7' so that the water stream propels the cleaning elements from the adapter 7', through the pipeline and into the adapter 7. The same procedure is repeated again and again until the cleaning operation is completed.

The metering unit 3 of the apparatus 1 which is shown in FIG. 1 comprises a substantially horizontal metering cylinder 10 having two spaced-apart supports 8 and 9 which connect it with the conduit 4 between the tap 6 and the shuttle valve 2. The cylinder 10 is or can be parallel with the conduit 4, and one of the end portions of its tube or pipe 22 (see FIG. 2) carries a connector 11 for an additive-containing vessel 13. The connector 11 has a nipple 12 which extends substantially radially of the cylinder 10 and serves as a means for mechanically coupling the connector 11 with the vessel 13. The latter can contain a supply of flowable solid, liquid or gaseous additive, e.g., a detergent or a disinfectant which is to be added to the stream of tap water in the conduit 4 upstream of the inlet 105' of the shuttle valve 2.

The dimensions of the vessel 13 can be selected in such a way that the quantity of confined additive therein suffices for a single metering operation or for two or more successive metering operations. It is preferred to make the pipe or at least a portion of the pipe 22 of the metering cylinder 10 from a light transmitting (transparent or translucent) material, e.g., acrylic resin or plastic. The quantity of metered additive can be varied in a number of ways, for example, by replacing the illustrated cylinder 10 with a shorter or longer cylinder or by replacing the illustrated cylinder with a metering cylinder having a larger or smaller diameter. The metering action will be selected in dependency upon a plurality of variables, such as the composition of the cleaning liquid in the conduit 4, the speed of the liquid stream in the conduit 4, the composition (particularly concentration) of flowable additive in the vessel 13 and/or the nature of the system to be cleaned by liquid which is caused to flow back and forth between the adapters 7, 7' of the shuttle valve 2. Another mode of adjusting the metering action of the cylinder 10 is to change the distance of the supports 8 and 9 from each other because the support 8 has a (first) channel 28 (FIG. 2) for admission of additive into the conduit 4.

Figure 2:
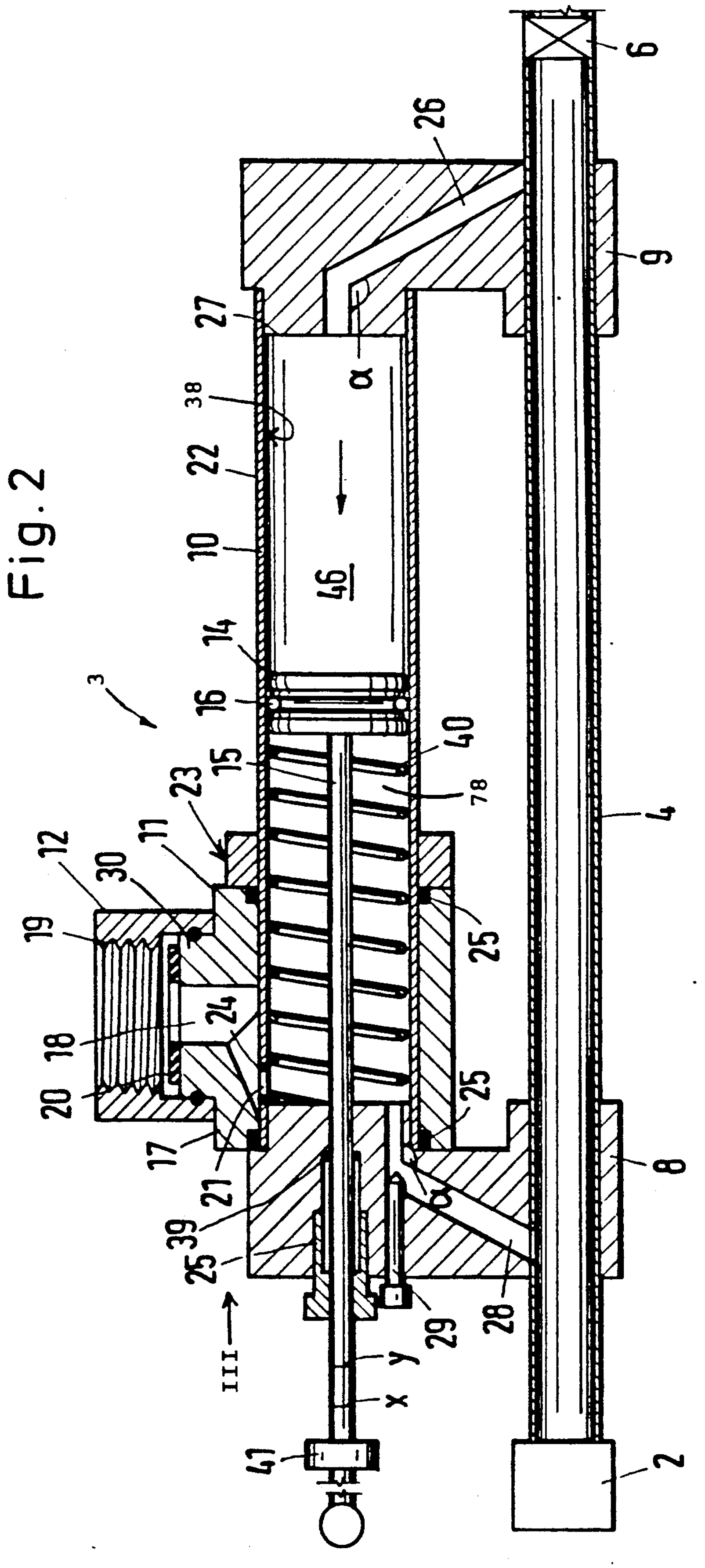
FIG. 2 is a central longitudinal vertical sectional view of the metering apparatus, with the vessel for flowable additive detached from the connector.

The details of one of the presently preferred embodiments of the metering apparatus 1 are shown in FIG. 2. The connector 11 comprises a sleeve-like component 17 (hereinafter called sleeve for short) which surrounds a portion of the pipe 22 and is turnable thereon between at least two positions including a first position in which the vessel 13 is located at a first level (e.g., exactly above the cylinder 10) and a second position in which the vessel 13 is maintained at a second level below the first level. The means for expelling metered quantities of additive from the pipe 22 of the cylinder 10 comprises a piston 14 which can be reciprocated in a number of ways, including by way of an elongated piston rod 15 having a free end with a knob or another suitable handle outside of the cylinder 10. The support 8 contains a bearing sleeve 25 which guides the piston rod 15 and cooperates with one or more seals (one shown at 39) to prevent leakage of additive from the internal compartment 78 of the cylinder 10 along the piston rod 15. The piston 14 can be pulled by the piston rod 15 in a direction to the left (as seen in FIG. 2) to expel a metered quantity of additive from the compartment 78, the expelled additive flowing through the channel 28 in the support 8 and into the stream of cleaning liquid in the pipe 4 downstream of the tap 6 but upstream of the inlet 105' of the shuttle valve 2.

The piston rod 15 carries indicia two of which are shown at x and y and which enable the operator to select the quantity of additive to be expelled from the compartment 78 into and beyond the channel 28 of the support 8. The pointer which cooperates with the scale including the indicia or graduations x and y can be constituted by the left-hand end face of the bearing sleeve 25 in the support 8 of the cylinder 10.

The piston 14 is provided with at least one circumferential groove for a ring-shaped seal, such as an O-ring 16 which bears against the internal surface 38 of the pipe 22.

The cylindrical internal surface of the sleeve 17 can engage the peripheral surface of the tube 22 with a certain amount of friction which should preferably suffice to maintain the connector 11 and the vessel 13 in a selected angular position with reference to the horizontal or nearly horizontal axis of the cylinder 10. However, such friction can be overcome by a hand which is applied to the vessel 13 and/or to the connector 11 in order to move the unit including the connector and the vessel between the aforementioned first and second positions in which the vessel 13 is respectively located at a relatively high first level and at a lower second level. When moved to the second position, the connector 11 can maintain the nipple 12 in a horizontal position (i.e., at right angles to the position of FIG. 2) or in a fully or nearly fully inverted position in which the nipple 12 and/or the vessel 13 abuts the conduit 4.

The sleeve 17 of the connector 11 defines a second channel 18 which communicates with the interior of the vessel 13 (when the latter is separably coupled to the connector 11 by the nipple 12) to admit additive into the compartment 78 while the connector 11 is held in the first position. At such time, the channel 18 is free to admit additive into the compartment 78 by way of a (first) opening or port 21 which is provided in the upper portion of the pipe 22 and is surrounded by an elastic sealing ring 24 which engages the cylindrical internal surface of the sleeve 17.

The vessel 13 comprises a neck 13a (FIG. 1) with an external thread (not specifically shown) which can be brought into mesh with the internal thread 19 of the nipple 12. When the neck 13a is properly installed in the nipple 12, its end face engages a deformable sealing washer 20 on an external shoulder of the sleeve 17. An arresting device or stop 23 is provided on the pipe 22 of the cylinder 10 to maintain the sleeve 17 in a selected axial position, e.g., in abutment with a shoulder of the support 8. The manner of maintaining the stop 23 at a selected distance from the supports 8 and 9 is not shown in the drawing; for example, the stop 23 can be adhesively secured to the pipe 22 or is mechanically secured to the pipe 22 by a radially extending screw, not shown.

Sealing rings 25 are installed between the pipe 22 and the two axial ends of the internal surface of the sleeve 17.

The right-hand portion of the pipe 22 can form part of a fluid-operated (preferably hydraulic) cylinder and piston unit or motor which can be actuated in automatic response to opening of the tap 6 to induce the piston 14 to expel a metered quantity of additive from the compartment 78 of the metering cylinder 10 into the conduit 4 upstream of the inlet 105' of the shuttle valve 2. To this end, the right-hand support 9 of the cylinder 10 is provided with a passage 26 which admits pressurized tap water into the adjacent end 27 of the pipe 22 in automatic response to opening of the tap 6. The major portion of the passage 26 preferably makes with the axis of the cylinder 10 an obtuse angle alpha in order to reduce the resistance to the flow of pressurized tap water from the conduit 4 into the compartment 46 which is disposed to the right of the piston 14. The discharge end of the passage 26 in the support 9 is preferably disposed centrally of the end 27 to ensure that the inflowing jet of pressurized tap water initially impinges upon the central portion of the right-hand end face of the piston 14.

The major portion of the first channel 28 is also inclined relative to the horizontal axis of the cylinder 10 (note the obtuse angle alpha prime which is shown in the left-hand portion of FIG. 2 and can but need not match the angle alpha). The metered quantity of additive (which is expelled from the compartment 78 via channel 28 in response to leftward movement of the piston 14 under the action of the piston rod 15 and/or under the action of pressurized cleaning liquid in the compartment 46) is admixed to the stream of cleaning liquid flowing from the tap 6 toward and into the inlet 105' of the shuttle valve 2. Such additive can but need not be dissolved (either entirely or in part) in the stream of cleaning liquid flowing in the conduit 4 from the tap 6 toward and into the valve 2.

The rate of expulsion of additive from the compartment 78 into the channel 28 and thence into the conduit 4 can be regulated by an adjustable flow restrictor 29, e.g., a screw having an externally threaded shank with a tip which can control the flow of additive from the narrower upper portion into the larger lower portion of the first channel 28. The axial position of the shank of the flow restrictor 29 determines the speed at which the piston 14 can be pulled or pushed to the left, i.e., in a direction to reduce the volume of the compartment 78 for additive while simultaneously increasing the volume of the compartment 46 for cleaning liquid.

Expulsion of additive from the compartment 78 takes place while the sleeve 17 of the connector 11 maintains the vessel 13 in the second position, namely when the internal surface of the sleeve 17 seals the opening 21 in the pipe 22 from the second channel 18. As a rule, such expulsion will take place in automatic response to opening of the tap 6 which then admits a first or main stream of cleaning liquid into the conduit 6 and a smaller second stream of cleaning liquid into the passage 26 for introduction into the compartment 46 of the cylinder 10. Expulsion of additive from the compartment 78 preferably takes place against the opposition of a resilient element in the form of a resetting or restoring coil spring 40 which is installed in the compartment 78 to react against the right-hand end face of the support 8 and to bear against the left-hand side of the piston 14. The spring 40 can maintain the piston 14 in a selected axial position (e.g., in an end position at a maximum distance from the support 8) when the pressure in the compartment 46 is low. The rate at which the piston 14 expels additive from the compartment 78 depends primarily upon the selected axial position of the flow restrictor 29 and on the pressure of cleaning liquid in the compartment 46. The piston 14 comes to a halt in a left-hand end position which is determined by the pressure of cleaning liquid in the compartment 46 and/or by the bias of the spring 40. The arrangement may but need not be such that the piston 14 comes to a halt only when the neighboring convolutions of the spring 40 actually touch each other, i.e., when the spring is converted into a solid block which is adjacent the support 8.

The action of the spring 40 upon the piston 14 can be assisted by an operator who holds the knob at the exposed end of the piston rod 15 and pushes the piston 14 toward the support 9. The angular position of the connector 11 is or can be changed in automatic response to movement of the piston 14 to the starting position of FIG. 2 in which the compartment 78 can receive a predetermined quantity of additive via channel 18 and opening 21. The metering apparatus 1 is then ready to introduce a fresh metered quantity of additive into the stream of cleaning liquid in the conduit 4 by moving the piston 14 to the left through the medium of the piston rod 15 and/or in response to admission of pressurized cleaning liquid into the passage 26 of the support 9 and thence into the compartment 46 of the cylinder 10. A second flow restrictor, e.g., an adjustable flow restrictor similar to the flow restrictor 29, can be provided in or on the support 9 to regulate the flow of pressurized cleaning fluid from the tap 6 and conduit 4 into the compartment 46.

The piston rod 15 is preferably provided with an axially adjustable or fixed movement-limiting stop 41 which determines the maximum extent of advancement of the piston 14 toward the support 9. For example, the stop 41 can constitute a nut which meshes with an external thread of the piston rod 15 to thus enable an operator to move the stop 41 to a position of register with a selected graduation on the piston rod 15 and to thus select the maximum capacity of the compartment 78. If the piston rod 15 is provided with the stop 41, this stop limits the extent of movement of the piston 14 toward the support 9 under the bias of the spring 40 or in response to manual shifting of the piston by way of the piston rod 15.

FIG. 3 shows the sleeve 17 prior to mounting on the pipe 22 of the cylinder 10. The sleeve 17 has a short radially extending nipple 30 with a circumferentially extending external groove 31 for a split ring or another suitable connector (not shown) which serves to couple the nipple 12 to the nipple 30. However, it is equally within the purview of the invention to omit the nipple 12, to lengthen the nipple 30, and to provide the lengthened nipple 30 with an internal thread corresponding to the internal thread 19 shown in FIG. 2. The design which is shown in FIGS. 2 and 3 (with nipples 30 and 12) is preferred at this time because the nipple 12 (which is a short tube) can be readily replaced with a different nipple adapted to be separably connected to the nipple 30 and to support a smaller or larger vessel 13.

The connector 11 and the pipe 22 of the cylinder 10 can be said to constitute a filling valve which can be manipulated (by turning the sleeve 17 about the pipe 22) for the purpose of permitting or preventing entry of a metered quantity of additive into the cylinder 10, i.e., into the metering compartment 78. The second position of the connector 11 relative to the cylinder 10 is preferably selected in such a way that the additive cannot drip into the compartment 78; this is achieved by positioning the outlet of the vessel 13 beneath the opening 21 of the pipe 22 when the connector 11 is caused to assume its second position. The dimensions of the vessel 13 suffice to facilitate convenient turning of the connector 11 about the pipe 22 between the first and second positions. If the piston 14 is not used as a means for drawing additive into the compartment 78 by suction, the vessel 13 discharges additive exclusively by gravity flow while the connector 11 is maintained in the first position and while the compartment 78 is still in the process of being filled.

The feature that the connector 11 and the vessel 13 are turnable about the normally horizontal or nearly horizontal axis of the cylinder 10 contributes to compactness of the improved metering apparatus.

The vessel 13 can constitute a commercially available container, e.g., a bottle which confines a flowable additive. The nipple 12 is then designed to accept the neck of a commercially available bottle. The bottle can be refilled or is discarded after a single use. The bottle will be discarded after a single use if it is relatively small and/or if the additive is of a nature which could injure the hands of the person in charge. Thus, by using a commercially available bottle, the operator merely opens the bottle and connects its neck to the nipple 12 while the latter extends downwardly to thus greatly reduce or practically eliminate the danger of injury, even if the additive is a caustic or acidic substance. The vessel 13 can further serve as a convenient handle to facilitate turning of the connector 11 about the tube or pipe 22 of the metering cylinder 10.

The apparatus of FIG. 2 can be used with advantage to admit metered quantities of different additives. Thus, a first vessel 13 which contains a caustic substance can be followed by a second vessel containing an acidic or another (different) caustic substance or a disinfectant. If the neck **13*a* of the second vessel is different from the neck of the first vessel, the illustrated nipple 12** will be replaced with a nipple which can accept the neck of the second vessel.

It is equally within the purview of the invention to provide the sleeve 17 of the connector 11 with two or even more discrete nipples 30 each of which can be engaged by a different nipple 12. One of several nipples can accept the neck of a first bottle and another nipple can accept the (different) neck of a second bottle. This renders it possible to affix to the sleeve 17 several vessels 13 and to leave such vessels on the connector 11 while the sleeve 17 is manipulated to effect the transfer of additive from a selected vessel.

The illustrated internal thread 19 of the nipple 12 can be replaced with any other suitable coupling or connecting device, e.g., with a bayonet mount, with a quick-release coupling, with a combined coupling and safety locking device and/or others. The exact nature of the means for releasably coupling the connector 11 with one or more vessels will depend on the nature of complementary coupling or connecting means on the vessel, especially if the apparatus is designed to use commercially available vessels. FIG. 2 shows that the nipple 12 has an internal thread 19 because the necks of many commercially available vessels (particularly bottles) are provided with external threads to accept internally threaded caps or analogous closing or sealing devices.

The provision of a nipple 12 which is a discrete part and is separably connectable with the integral nipple 30 of the sleeve 17 is often desirable because this even further simplifies the task of separably securing the neck (**13*a*) of a commercially available bottle (13) to the sleeve 17. Thus, all that is necessary is to mount the nipple 12 on the neck 13*a* of a bottle which contains a supply of selected additive and to thereupon couple the nipple 12 to the nipple 30. The connection between the nipples 12, 30 can be of the quick-release type so that the attachment of nipple 12 to, or its detachment from, the nipple 30 takes up a very short interval of time. In addition, the operator need not even contact the nipple 12 after the latter is secured to the neck of a bottle; instead, the operator manipulates the bottle to establish or terminate a separable connection between the nipples 12 and 30. The nipple 12** can constitute a simple and inexpensive internally threaded cylinder or a cylinder which carries one part of a bayonet mount or the like.

The sealing elements which are installed around the piston rod 15, between the support 9 and/or 8 and the pipe 12, around the opening 21 and between the sleeve 17 and the pipe 22 can constitute commercially available O-rings or any other suitable sealing means. For example, the sealing rings 25 can be recessed into grooves (not references) which are machined into or otherwise formed in the internal surface of the sleeve 17.

The piston rod 15 enables an operator to select the quantity of additive which can enter the compartment 78 in the first position of the connector 11. The person in charge can observe the indicia on the piston rod 15, the position of the piston 14 in the light-transmitting pipe 22 and/or the position of the adjustable stop 41 relative to the indicia on the piston rod 15 to select practically any desired metered quantity of additive which is to be admitted into the stream of cleaning liquid in the conduit, i.e., to determine the concentration of additive in the cleaning liquid.

Each of the supports 8 and 9 performs several functions. Thus, the supports maintain the pipe 22 of the cylinder 10 at an optimum distance from the conduit 4, these supports establish a connection between the pipe 22 and the conduit 4, the support 9 admits pressurized liquid into the compartment 46 of the cylinder 10, the support 8 defines the channel 28, and the support 8 cooperates with the arresting device 23 to maintain the sleeve 17 of the connector 11 in an optimum axial position on the pipe 22.

The illustrated supports 8, 9 can be replaced with supports which can properly support a larger-diameter or a smaller-diameter pipe 22. Furthermore, the support 8 and/or 9 can be shifted in the axial direction of the conduit 4 to permit the utilization of a longer or shorter pipe 22.

The adjustable flow restrictor 29 exhibits the advantage that the operator is in a position to infiinitely vary the speed at which the piston 14 can be moved away from the support 9, i.e., in a direction to expel additive from the compartment 78. The selection of maximum speed of the piston 14 in a direction to expel additive from the metering cylinder can be made irrespective of the diameter of the pipe, irrespective of the capacity of the compartment 78, independently of the nature or composition of the additive, and independently of the pressure of liquid which is admitted into the compartment 46. Thus, the operator in charge can select the rate of admission of additive (per unit of time) into the stream of liquid in the conduit 4 with a very high degree of accuracy in spite of the simplicity of the improved apparatus. The selected rate of admission of additive per unit of time remains unchanged as long as desired.

Referring to FIG. 4, there is shown that the axis of the conduit 4 can be located in a horizontal or nearly horizontal plane which further includes the axis of the pipe 22 of the metering cylinder 10. The integral nipple 12 of the sleeve 17 forming part of the connector 11 extends vertically downwardly in the second position of the vessel 13 and vertically upwardly in the first position of the vessel (namely when the channel 18 is free to communicate with the opening 21 in the upper portion of the pipe 22). The end portion of the nipple 12 (which is shown as being in one piece with the sleeve 17) has a radially outwardly extending flange 32 serving as an abutment for a union nut 36 which abuts the end face 33 of the flange 32 and has an internal thread mating with the external thread 35 on the neck 34 of the vessel 13. FIG. 4 shows the neck 34 in sealing engagement with the connector 11 because the end face of the neck 34 is caused to bear against the adjacent end face of the flange 32 on the integral nipple 12 of the sleeve 17. An advantage of the embodiment which comprises the structure of FIG. 4 is that the conduit 4 cannot interfere with angular movements of the connector 11 and vessel 13 through 180° or more. The operator can readily memorize that the opening 21 is free to admit additive from the vessel 13 into the pipe 22 of the cylinder when the vessel 13 is located directly above the sleeve 17, and that the opening 21 is sealed from the channel 18 when the vessel 13 is located in the illustrated second (lower end) position.

The structure which is shown in FIG. 4 exhibits the advantage that the union nut 36 need not be rigidly secured or threadedly connected to the nipple 12, i.e., to an integral part of the sleeve 17. All that is necessary is to bring the external thread 35 on the neck 34 of the vessel 13 into mesh with the internal thread of the nut 36 and to rotate the nut until the upper end face of the neck 34 reaches and sealingly engages the adjacent end face of the flange 32.

It is equally within the purview of the invention to employ springy clamps, claws, jaws or like parts in order to reliably but separably secure a vessel 13 to the sleeve 17. One end of each such springy element can be affixed to the sleeve 17 while another part (e.g., the other end) of each springy element engages a bottle or another vessel which contains a supply of selected additive.

FIG. 5 shows that the O-ring 16 in the circumferential groove of the piston 14 of FIG. 2 can be replaced with an annular lip seal 37 which bears against the internal surface 38 of the pipe 22 as well as against the bottom surface in the circumferential groove of the piston 14. If desired, the piston 14 can carry two or more annular sealing elements to even further reduce the likelihood of leakage of cleaning liquid from the compartment 46 into the compartment 78 and/or the likelihood of leakage of additive from the compartment 78 into the compartment 46.

An advantage of the lip seal 37 is that the friction with the internal surface 38 of the pipe 22 of the cylinder 10 is less pronounced than if the piston 14 were to carry one or more standard O-rings. This is desirable because it requires less effort to manually move the piston 14 and/or a lower pressure of cleaning liquid to displace the piston in response to opening of the tap 6.

Referring to FIG. 6, there is shown a modified support 9 which is designed in such a way that the pressure of cleaning liquid which is directed into the compartment 46 of the metering cylinder 10 is reduced much less than in the apparatus of FIG. 2. Thus, the tap 6' is installed in a nipple 43 which is in full or substantial axial alignment with the pipe 22 of the metering cylinder 10, and the support 9 of FIG. 6 has a passage 45 which is parallel to the compartment 46 and to the axis of the nipple 43. The passage 45 has an inclined branch 44 which admits a stream of cleaning liquid from the open tap 6' into the adjacent receiving end of the conduit 4. The external surface 42 of the support 9 which is shown in FIG. 6 is provided with a socket for a portion of the nipple 43, and this socket communicates with the passage 45 and with the branch passage 44. The angle between the passages 44, 45 is preferably a relatively large acute angle. The discharge end of the passage 45 is located centrally of the adjacent end face 27 of a cylindrical projection which forms part of the support 9 and extends into the receiving end of the pipe 22. It has been found that the pressure of cleaning liquid in the compartment 46 of the metering cylinder 10 is much higher if the compartment 46 receives pressurized cleaning liquid in a manner as shown in FIG. 6, i.e., by way of a passage 45 which is coaxial with the compartment 46.

Figure 7:
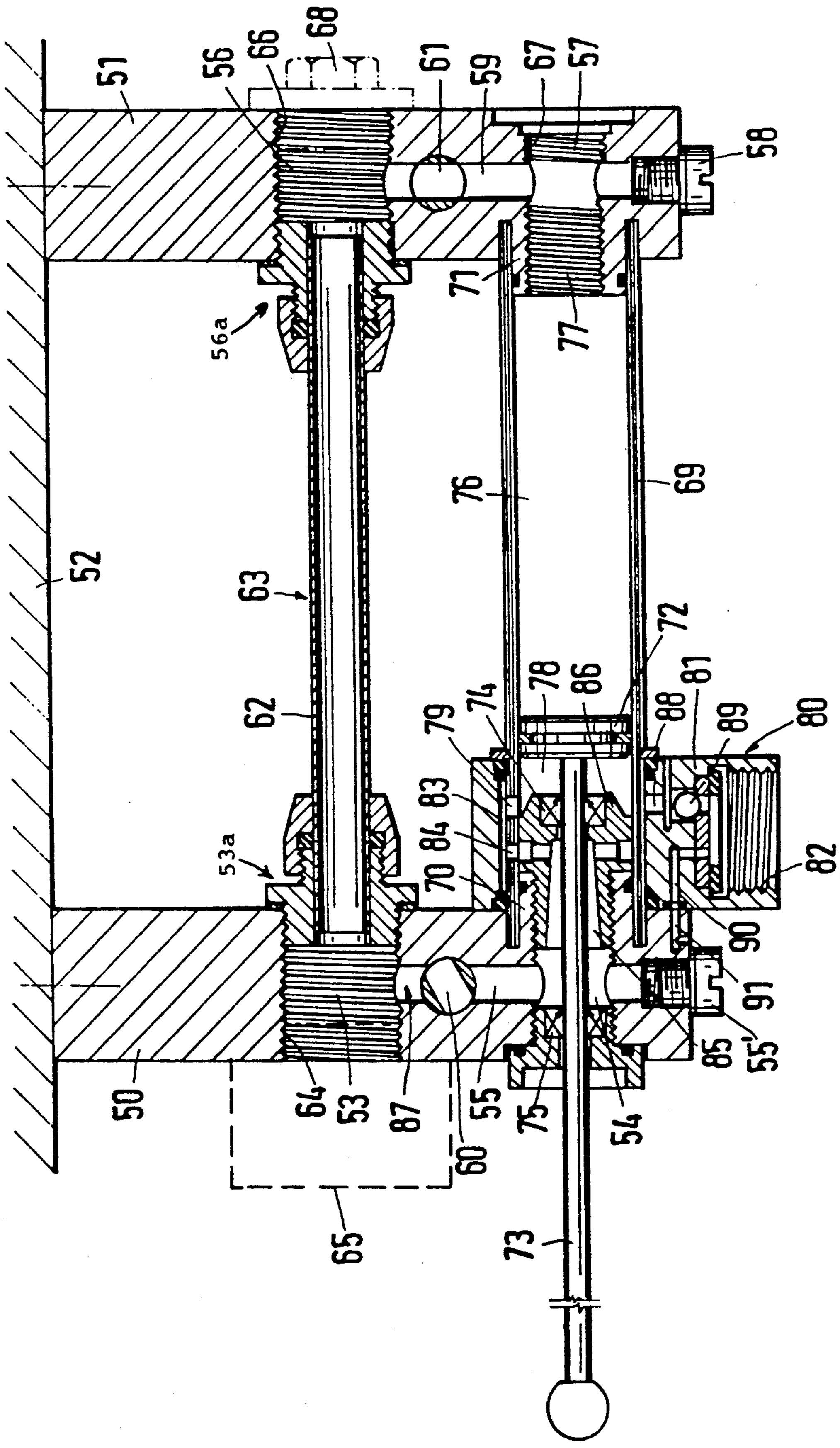
FIG. 7 is a central longitudinal horizontal sectional view of a further metering apparatus, a portion of the receiver being indicated by broken lines and the connector on the metering cylinder being shown in the second position.

FIG. 7 shows a further metering apparatus wherein the metering cylinder 69 comprises a pipe or tube of at least partially light transmitting material and two identical or substantially identical supports 50, 51 at the two axial ends of the pipe. The supports 50, 51 are affixed to a carrier 52 (e.g., a vertical wall).

The support 50 is provided with two tapped bores or holes 53 and 54 which are parallel with a conduit 63 for cleaning liquid and with the pipe of the metering cylinder 69. The support 50 is further provided with a blind bore 55 which is normal to and communicates with the tapped bores 53, 54. The open end of the blind bore 55 is tapped to receive the externally threaded shank of a sealing plug 55'. The support 51 has two tapped bores or holes 56, 57 which are parallel to the bores 53, 54 and are communicatively connected to each other by a blind bore 59 having an open end which is sealed by a threaded plug 58 corresponding to the plug 55'. The blind bore 55 contains a first adjustable flow restrictor 60, and a similar adjustable flow restrictor 61 is installed in the bore 59 of the support 51. Each of the flow restrictors 60, 61 can comprise or constitute a valve having a rotary spool-shaped valving element.

The bores 53, 56 are tapped, as at 64 and 66, and receive the externally threaded portions of two adapters 53*a*, 56*a* for the respective ends of a pipe 62 forming part of or constituting the conduit 63. The adapters 53*a*, 56*a* are provided with sealing rings or with other suitable means for preventing leakage of pressurized cleaning liquid from the conduit 63.

The reference character 65 denotes in FIG. 7 a further adapter which can be used to connect the support 50 (and hence the conduit 63) with the inlet (see the inlet 105' of FIG. 1) of a shuttle valve corresponding to the shuttle valve 2 of FIG. 1.

The right-hand end of the tapped bore 56 in the support 51 is sealed by a detachable plug 68 having an external thread mating with the internal thread 66. The plug 68 can be removed if a conduit (not shown) is to be provided for admission of pressurized cleaning liquid directly into the bore 56 and thence into the pipe 62 of the conduit 63.

The support 51 further comprises a nipple 71 which extends into the adjacent end of the pipe of the metering cylinder 69 and has an axial bore 77 adapted to receive pressurized cleaning liquid from a conduit (not shown but corresponding, e.g., to the nipple 43 of FIG. 6) which admits pressurized cleaning liquid from a tap so that the pressurized liquid can flow into the adjacent compartment 76 of the cylinder 69. The nipple (such as 43) which supplies pressurized cleaning liquid into the bore 57 of the support 51 can be provided with an external thread in order to mate with an internal thread 67 in the bore 57. The flow restrictor or valve 61 is set to permit controlled flow of cleaning liquid from the bore 57, through the blind bore 59 and into the bore 56 for admission into the conduit 63, i.e., into the shuttle valve which is connected to the support 50 by way of the adapter 65. As will be described with reference to FIG. 9, the nipple 43 can be introduced into the bore 56 in lieu of the plug 68 and the internal thread 67 in the bore 57 can mesh with the external thread of a pipe which then serves to admit a compressed gaseous fluid (e.g., $CO_2$ gas) to propel the piston 72 in a direction to the left, i.e., in a direction to expel a metered quantity of additive from the compartment 78 of the cylinder 69.

The pipe of the metering cylinder 69 is held in the illustrated position by the nipple 71 of the support 51 and by a similar nipple 70 which is an integral part of the support 50. The piston 72 of the means for expelling metered quantities of additive from the compartment 78 into the bore 53 (for admission into the inlet of the shuttle valve) is provided with a piston rod 73 which extends from the cylinder 69 and can be manipulated by hand, e.g., to select the starting (right-hand end) position of the piston 72 and to thus select the ratio of capacities of the compartments 76, 78 in the pipe of the cylinder 69. The support 50 contains sealing elements 74 and 75 which sealingly engage the piston rod 73 to prevent uncontrolled leakage of additive from the compartment 78.

The pipe of the metering cylinder 69 has a first opening 79 and a second opening 84 which is spaced apart from the opening 79 in the longitudinal (axial) direction of the cylinder 69 and can communicate with the opening 79 in a selected angular position of the sleeve 81 of a connector 80. The sleeve 81 has a cylindrical internal surface which is provided with a third channel in the form of an axially parallel groove 83 to establish communication between the openings 79, 84 in the predetermined angular position of the sleeve 81. The opening 79 communicates with the metering compartment 78 of the cylinder 69.

A radially extending nipple 82 of the sleeve 81 can be separably coupled with a vessel 92 (see FIGS. 8 and 9) which contains a requisite supply of flowable additive, e.g., a disinfectant or a detergent.

The second opening 84 of the pipe forming part of the cylinder 69 is in permanent communication with an axial conical hole 85 provided in an insert 86 which is installed in the support 50. The hole 85 forms part of a (first) channel 87 which corresponds to the channel 28 of FIG. 2 and serves to convey expelled additive from the compartment 78 through the opening 79, third channel or groove 83, opening 84, bore 85, bore 54, bore 55, flow path which is established by the flow restrictor valve 60 and bore 53, and into the inlet of the shuttle valve which is connected to the adapter 65, i.e., into the stream of cleaning liquid which is supplied by the pipe 62 of the conduit 63.

The openings 79 and 84 are shown in FIG. 7 at an angle of 90° from their actual positions. In actual practice, these openings are provided in the top part of the pipe of the cylinder 69 (note the opening 21 in FIG. 4). The connector 80 is also turned through 90° with reference to its corresponding actual position, namely when its (third) channel or groove 83 establishes communication between the openings 79 and 84; at such time, the axis of the nipple 82 is normal to the plane of FIG. 7 and the nipple 82 is located exactly beneath the pipe of the cylinder 69.

The internal groove or channel 83 of the sleeve 81 is located diametrically opposite a second channel 88 (corresponding to the channel 18 of FIG. 2) which serves to admit additive from the vessel 92 into the compartment 78 when the connector 80 assumes its first position (in which the nipple 82 extends vertically upwardly and is located above the pipe of the cylinder 69). The channel 88 contains a check valve 89 which permits the additive to flow by gravity from the vessel 92 into the compartment 78 in the first position of the connector 80 but seals the channel 88 from the interior of the vessel 92 in the second position of the connector 80. Thus, when the vessel 92 is located at a level above the pipe of the cylinder 69, a stream of additive can flow from the vessel 92, through the nipple 82 and through the channel 88 to enter the compartment 78 by way of the first opening 79. The piston 72 can draw additive into the compartment 78 by suction if it is caused (by an operator through the medium of the piston rod 73) to perform a stroke in a direction to the right while the vessel 92 is located at a level above the cylinder 69.

The connector 80 of FIG. 7 is further provided with an aerating or venting channel 90 which is machined into the sleeve 81 and communicates with a stationary venting or aerating channel 91 of the support 50 when the connector 80 is maintained in the second position (in which the vessel 92 is located at a level below the cylinder 69). It will be noted that the actual position of the stationary aerating channel 91 is at an angle of 90° to the illustrated position.

An important advantage of the connector 80 is its versatility. Thus, this connector cooperates with the pipe of the cylinder 69 to constitute a filling valve which opens or closes in automatic response to turning of the connector to its first or second position. In addition, the sleeve 81 of the connector 80 constitutes a valving element which automatically seals the channel 87 from the compartment 78 in the first position of the connector 80 so that the channel 87 prevents escape of additive while the additive is being admitted via channel 88. This is accomplished in that the channel 83 is spaced apart from the openings 79 and 84 in that (first) position of the connector 80 in which the channel 88 admits additive into the compartment 78 by way of the opening 79.

The check valve 89 prevents the development of excessive pressure in the vessel 92 during expulsion or attempted expulsion of additive from the compartment 78, e.g., as a result of clogging of the channel 87.

The purpose of the venting or aerating channels 90, 91 is to ensure that the pressure in the vessel 92 returns to atmospheric when the connector 80 is moved from the first position. The channels 90, 91 can be designed to register as soon as the connector 80 leaves the first position, and these channels can remain in communication while the connector turns all the way to the second position or while the connector covers a certain portion of angular movement from the first to the second position.

Figure 8:
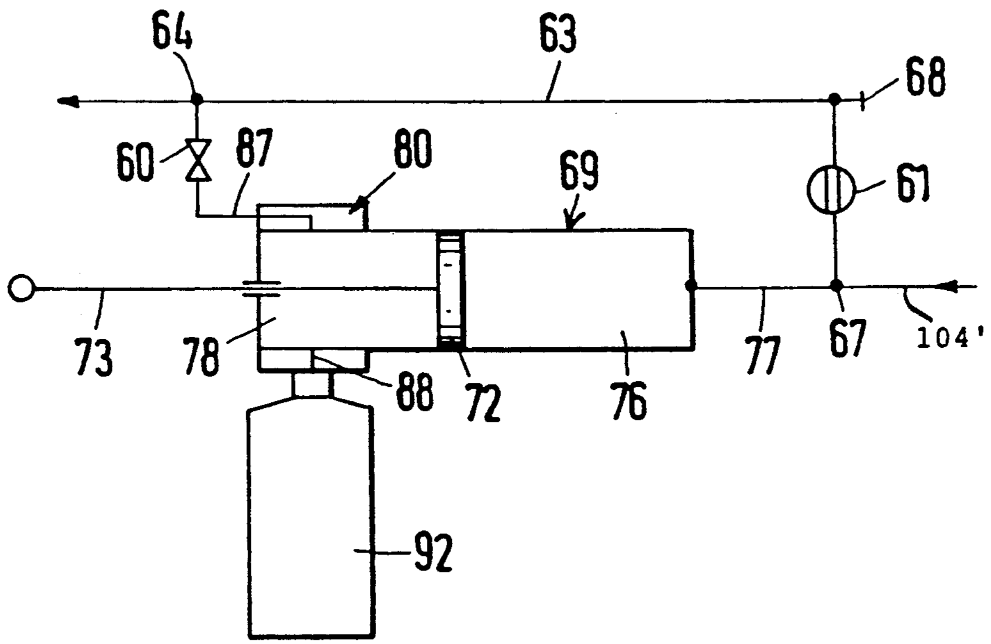
FIG. 8 is a diagram showing a first mode of operating the metering apparatus of FIG. 7.

Referring to FIG. 8, there are shown certain component parts of the metering apparatus of FIG. 7 in a condition ready to admit an additive into the stream of cleaning liquid which is supplied by the conduit 63 and enters the bore 53 which is surrounded by the internal thread 64. The vessel 92 and the connector 80 are shown in their second positions, i.e., with the vessel 92 at a level below the metering cylinder 69. The bore 57 which is surrounded by the internal thread 67 receives pressurized cleaning liquid from a valved conduit 104' or from another suitable source, and the setting of the flow restrictor valve 61 is such that some of the cleaning liquid enters the compartment 76 of the cylinder 69 while the remainder of the liquid stream flows into the conduit 63 and thence into the shuttle valve. The cleaning liquid can be tap water. The arrangement is or can be such that a relatively high percentage of inflowing cleaning liquid is admitted into the conduit 63 and only a relatively small percentage of cleaning liquid from the conduit 104' is used to displace the piston 72 in a direction to reduce the volume of the compartment 78. The channel 87 admits expelled additive into the stream of cleaning liquid which is discharged by the conduit 63 and is on its way toward and into the inlet of the shuttle valve. The rate of admission of additive into the liquid stream leaving the conduit 63 is determined by the setting of the flow restrictor valve 60 in the blind bore 55 of the support 50. The piston 72 is caused to move toward the support 50 in response to admission of pressurized liquid into the compartment 76 even if the pressure in the compartment does not exceed or does not appreciably exceed the pressure in the compartment 78 because the effective area of the piston 72 at the side facing the compartment 76 is greater than the effective area of the other side of the piston.

If the pressure in the compartment 76 does not suffice to move the piston 72 toward the support 50, the setting of the flow restrictor valve 61 in the blind bore 59 of the support 51 is changed in a sense to raise the pressure of cleaning liquid which enters the compartment 76 through the axial bore 77 of the nipple 71, i.e., to change the pressure differential between the compartments 76 and 78. Inversely, if the speed of movement of the piston 72 toward the support 50 is excessive, the operator simply changes the setting of the flow restrictor valve 60 in a sense to reduce the pressure of cleaning liquid in the compartment 76.

The illustrated flow restrictor valves 60, 61 can be replaced with other types of rotary, reciprocable or otherwise movable valves which can be adjusted to select the rate of flow of additive (valve 60) and cleaning liquid (valve 61). It is presently preferred to select flow restricting valves which (if and when necessary) can completely shut off the flow of additive and/or pressurized liquid.

Figure 9:
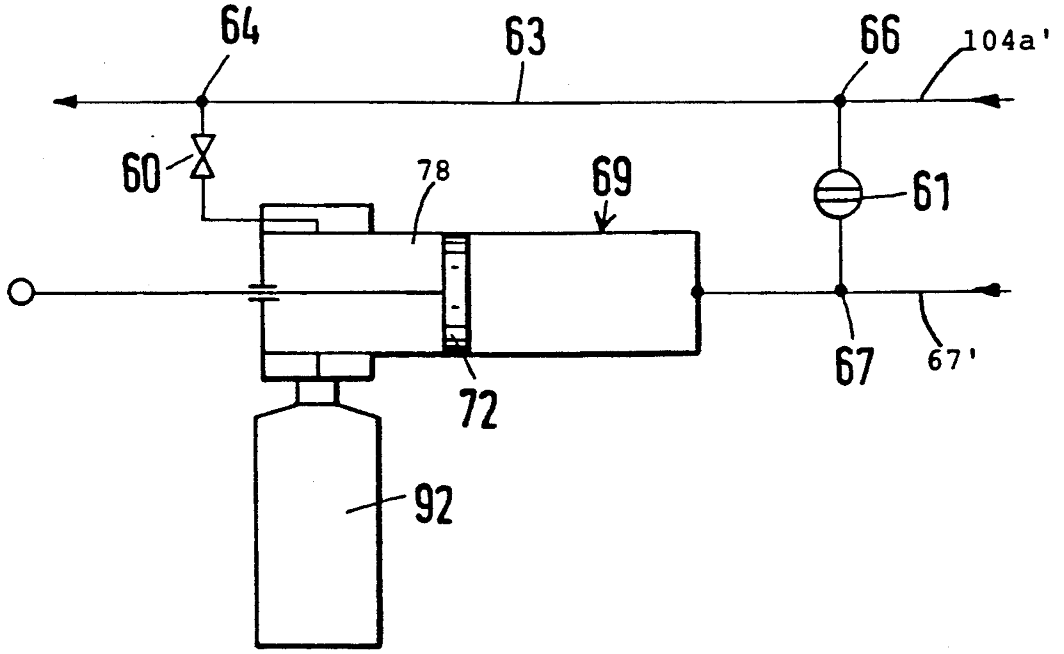
FIG. 9 is a diagram showing a second mode of operating the metering apparatus of FIG. 7.

FIG. 9 shows the apparatus of FIGS. 7 and 8 and a conduit 67' which serves to supply a pressurized gaseous fluid (such as $CO_2$ gas) into the bore 57 which is surrounded by the internal thread 67 of the support 51. The flow restrictor valve 61 is closed and the plug 68 of FIGS. 7 and 8 is removed so that the bore 56 can receive a pressurized cleaning liquid from a conduit **104*a*' which has an external thread meshing with the internal thread 66. The rate of admission of additive from the compartment 78 of the cylinder 69 into the shuttle valve which is connected to the conduit 63 is regulated by the adjustable flow restrictor valve 60**.

Instead of supplying $CO_2$ gas, the conduit **104*a*'** can be used to deliver a flow of air, nitrogen or another suitable gaseous fluid.

The adapter 65 is preferably designed to permit rapid attachment or disconnection of a four-way shuttle valve, such as the valve 2 of FIG. 1, or another valve. The mounting of the adapter 65 in or on the support 50 contributes to simplicity and compactness of the metering apparatus.

Figure 10:
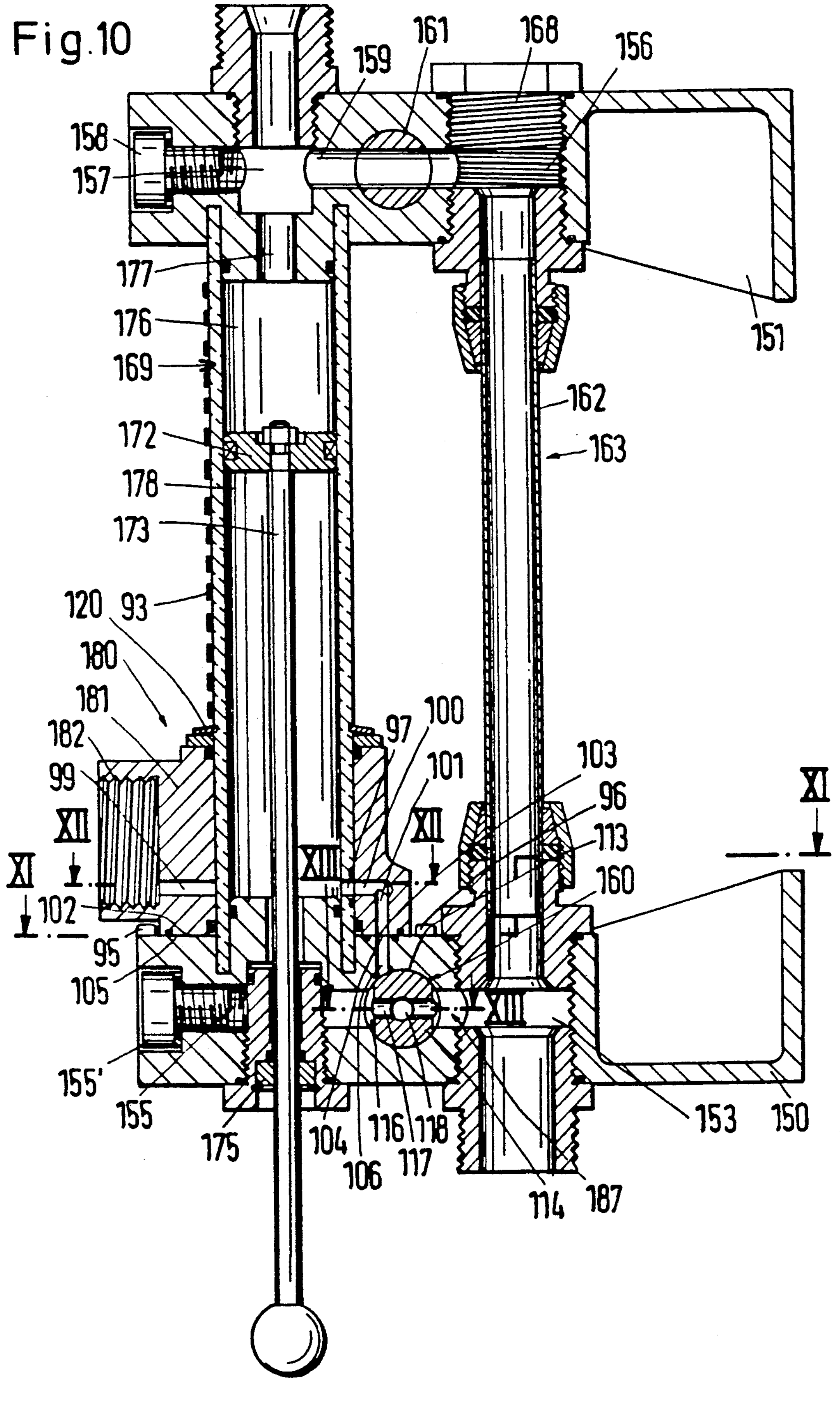
FIG. 10 is a horizontal sectional view of a further metering apparatus, the section being taken in the direction of arrows as seen from the line X—X in FIG. 11.
Figure 11:
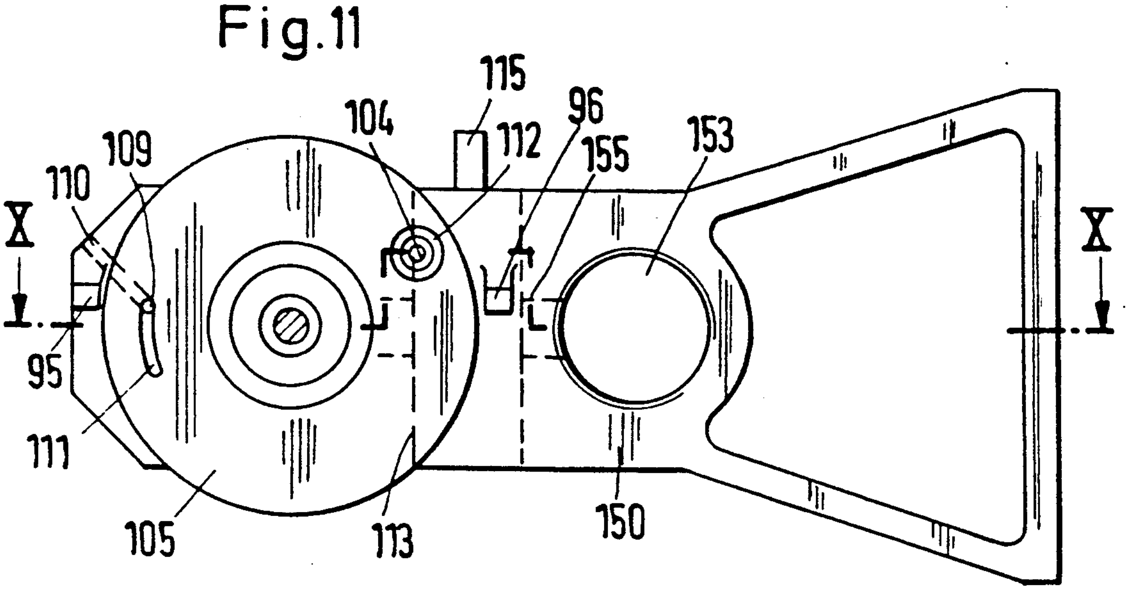
FIG. 11 is a vertical sectional view as seen in the direction of arrows from the line XI—XI of FIG. 10.

FIGS. 10 to 13 show certain details of a further metering apparatus which constitutes a modification of the metering apparatus of FIG. 7. All such parts of this apparatus which are identical with or clearly analogous to corresponding parts of the apparatus of FIG. 7 are denoted by similar reference characters plus 100. The (first) opening 97 in the pipe of the metering cylinder 169 is shown in FIG. 10 at an angle of 90° from its actual position (which is shown in FIG. 11). Analogously, the (second) channel 99, the (third) opening 100, the channel section 101, the (fourth) opening 103 and the nipple 182 of the connector 180 are shown in FIG. 10 at an angle of 90° to their actual positions (which are properly shown in FIGS. 11 to 12).

The pipe or tube of the cylinder 169 is made, at least in part, of a light transmitting material and carries means (in the form of a suitable scale 93) for indicating the quantity of additive in the compartment 178. The reciprocating piston 172 of the means for expelling additive from the compartment 178 serves as a pointer or index to pinpoint the confined quantity of additive by registering with the appropriate gradiation of the scale 93.

Figure 12:
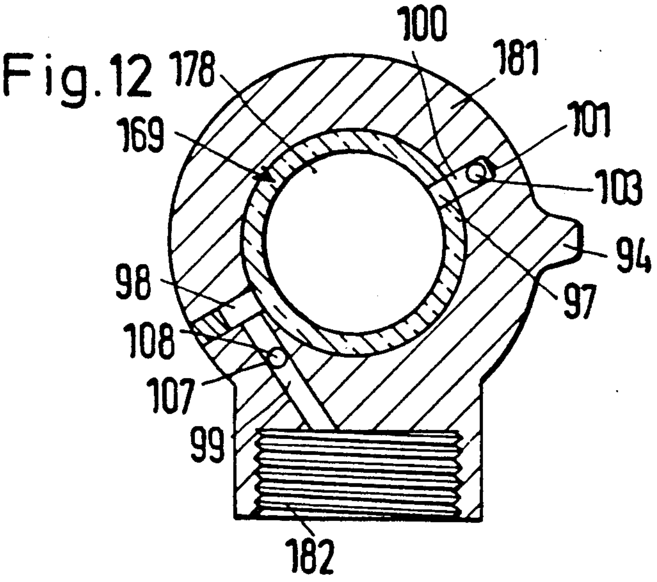
FIG. 12 is a vertical sectional view as seen in the direction of arrows from the line XII—XII of FIG. 10.

FIG. 12 shows the sleeve 181 of the connector 180 in the second position in which the nipple 182 for attachment to a vessel (such as the vessel 92 of FIG. 8 or 9) extends substantially vertically and is located at a level below the cylinder 169. The connector 180 must be turned through an angle of approximately or exactly 180° in order to assume the first position in which the vessel is located at the highest level, i.e., above the cylinder 169. The two end positions of the connector 180, its sleeve 181, its nipple 182 and the vessel which is connected to the nipple 182 are determined by a (mobile) first stop 94 on the sleeve 181 and two (stationary)

second stops 95, 96 on the support 150 of the metering cylinder 169.

When the connector 180 is maintained in the first position, the (first) opening 97 in the pipe of the cylinder 169 registers with a (second) opening 98 which is provided in the sleeve 181 and communicates with the (second) channel 99 which serves to admit additive from the vessel, through the nipple 182 and into the compartment 178 of the cylinder 169. When the connector 180 is moved to the second position (see FIG. 12), the first opening 97 communicates with a (third) opening 100 which is provided in the sleeve 181 and is in permanent communication with one end of an elongated first section 101 of the first channel 187. The first section 101 of the channel 187 is an elongated axially parallel bore in the sleeve 181 of the connector 180. The other end of the section 101 is located in the end face 102 of the sleeve 181, and such end face is immediately adjacent an end face 105 of the support 150. The end of the section 101 in the end face 102 can be said to constitute a fourth opening 103 which can be moved into register with a fifth opening 104 in the end face 105 of the support 150 when the connector 180 is caused to assume its second position. The opening 104 can be said to constitute one end of a second elongated section 106 of the channel 187, and such second section is provided in the support 150. The fourth opening 103 in the end face 102 is sealed by the end face 105 in each but the second position of the connector 180.

The channel 99 in the sleeve 181 communicates with an axially parallel bore 107 which extends to the end face 102 to terminate in a sixth opening 108. When the connector 180 leaves its first position (e.g., when the connector assumes an intermediate position between the first and second positions), the opening 108 communicates with a seventh opening 109 which is connected with the atmosphere by a channel 110 in the support 150 (see FIG. 11). The channel 110 (i.e., the hole 109) includes an arcuate portion 111 which communicates with the sixth opening 108 during a certain stage of angular movement of the connector 180 about the pipe of the cylinder 169. This ensures longer-lasting venting of the channel 99.

If desired or necessary, one or more openings can be surrounded by suitable sealing elements. This is shown, by way of example, in FIG. 11 where the opening 104 in the end face 105 of the support 150 is surrounded by an annular sealing element 112.

Figure 13:
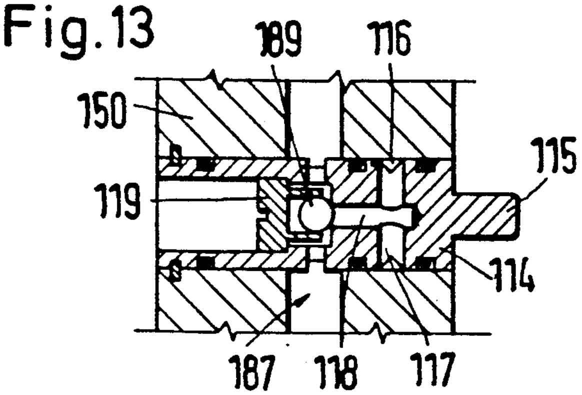
FIG. 13 is a vertical sectional view as seen in the direction of arrows from the line XIII—XIII in FIG. 10.

The second section 106 of the channel 187 communicates with a transverse bore 113 which contains a rotary valving element 114 turnable by a handle 115 (see FIG. 13). At the discharge end of the section 106, the valving element 114 is formed with a groove 116 which can be moved to a position of more or less pronounced communication with the discharge end of the section 106. This valving element 114 forms part of the flow restricting valve 160 corresponding to the valve 60 of FIG. 7. The groove 116 communicates with a transverse bore 117 and an axial bore 118 which latter is controlled by a check valve 189 having a spherical valving element which is held in requisite position by a threaded retainer 119. The check valve 189 opens during expulsion of additive from the compartment 178 of the cylinder 169 to permit additive to flow between the tapped bore 153 and the second section 106 of the channel 187. This check valve prevents the buildup of excessive pressure in the compartment 178 of the metering cylinder 169, e.g., as a result of improper manipulation of the piston 172.

An annular spring 120 (e.g., a diaphragm spring) is employed to bias the sleeve 181 of the connector 180 axially toward the support 150 so that the end face 102 of the sleeve 181 bears against the end face 105 of the support 150. This establishes a desirable sealing action of the end face 105 upon the openings in the end face 102 in certain angular positions of the connector 180, all as described above.

An advantage of the apparatus which is shown in FIGS. 10 to 13 is that the various openings or ports are provided in part in the internal surface and in part in the end face 102 of the sleeve 181. This renders it possible to select the distribution of various openings and of the valves which control the flow of additive in such openings practically at will. Moreover, all of the openings and channels are provided outside of the pipe of the cylinder 169 so that the entire internal space of the pipe for the piston 172 can be used for reception of a metered quantity of additive.

Another advantage of the apparatus of FIGS. 10 to 13 is that the number of angular positions in which the vessel 92 is in communication with the atmosphere is practically unlimited. This can be determined by appropriate selection of the length of the arcuate groove 111 in the end face 105 of the support 150. There is ample room at the end face 105 to ensure the formation of one or more channels for adequate aeration of the interior of the vessel which is coupled to the nipple 182 of the connector 180.

The connector 11, 80 or 180 need not be mounted directly on the pipe of the metering cylinder 10, 69 or 169. For example, the metering cylinder can be provided with a bearing (not specifically shown) which supports the connector and the vessel. If the connector is turnable on the pipe of the cylinder and the friction between the internal surface of the sleeve of the connector and the external surface of the pipe of the cylinder is rather pronounced, the apparatus can be provided or furnished with means for introducing a solid or other suitable lubricating agent between the relatively movable parts. The connector and/or the supports of the cylinder can be made of a metallic or plastic material. It is presently preferred to employ a plastic material.

The improved metering apparatus can be used with advantage in conjunction with the afore-discussed apparatus for cleaning pipelines in breweries, bars, restaurants, lunchonettes and similar establishments. However, the improved metering apparatus can be put to use (with equal or similar advantage) for many other purposes. For example, the apparatus can be used to admit metered quantities of flowable soap (e.g., soap powder) or detergent or softening agent into washing machines, for admission of soap suds in a washroom, or for admission of metered quantities of chemicals in a laboratory.

If the metering apparatus 1 is used in a manner as shown in FIG. 1, i.e., for admission of metered quantities of a suitable additive (or two or more additives) into a shuttle valve 2 in an apparatus for cleaning or flushing pipelines in breweries or the like, the channel 28 can be used to admit additive into the adapter 7 and/or 7' in lieu of into the conduit 4 (i.e., into the inlet 105' of the valve 2). The illustrated construction is preferred at this time because it is possible to admit an additive practically without interruption. The admission of a metered quantity of additive into the compartment 78 can take up a minute fraction of the time which elapses to admit a metered quantity of additive from the compartment 78 into the conduit 4.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for admitting metered quantities of a flowable additive into a receiver, comprising an elongated cylinder having at least one opening and a first channel; an additive-containing vessel; a connector defining a second channel for reception of additive from said vessel, said connector and said vessel being turnable about a substantially horizontal axis between a first position in which said vessel is located at a first level and said second channel admits additive into said cylinder by way of said at least one opening, and a second position in which said vessel is located at a second level below said first level and is sealed from said cylinder; and means for expelling additive from said cylinder by way of said first channel, including a fluid-operated piston which is reciprocably mounted in said cylinder.

2. The apparatus of claim 1, wherein said axis is defined by said cylinder.

3. The apparatus of claim 1, wherein said connector comprises means for sealing said second channel from said at least one opening in the second position of said connector and said vessel.

4. The apparatus of claim 1, further comprising a check valve installed in said first channel to prevent return flow of additive into said cylinder.

5. The apparatus of claim 1, further comprising a check valve provided in said second channel to prevent return flow of additive from said cylinder toward said vessel.

6. The apparatus of claim 1, wherein said connector comprises an aerating channel which is sealed in said first position of said connector and said vessel and which connects the interior of said vessel with the atmosphere when said connector and said vessel are moved away from said first position.

7. The apparatus of claim 1, further comprising means for mechanically coupling said vessel to said connector.

8. The apparatus of claim 7, wherein said connector comprises a sleeve surrounding said cylinder and said coupling means comprises a nipple on said sleeve.

9. The apparatus of claim 7, further comprising means for separably securing said coupling means to said connector.

10. The apparatus of claim 1, wherein at least a portion of said cylinder consists of light transmitting material.

11. The apparatus of claim 1, wherein said cylinder has a first end and a second end and said expelling means further comprises a source of pressurized fluid and means for admitting pressurized fluid from said source into said cylinder at one of said ends.

12. The apparatus of claim 11, further comprising a conduit connecting said source with the receiver, said fluid admitting means including a passage connecting said conduit with said cylinder.

13. The apparatus of claim 12, wherein said first channel communicates with said conduit downstream of said passage.

14. The apparatus of claim 1, wherein said piston has a piston rod extending from said cylinder.

15. The apparatus of claim 1, wherein said piston is movable in said cylinder in a first direction to expel additive by way of said first channel and in a second direction counter to said first direction, said expelling means further including means for biasing said piston in said second direction.

16. The apparatus of claim 1, wherein said expelling means further comprises means for limiting the stroke of said piston in said cylinder.

17. The apparatus of claim 16, wherein said limiting means is adjustable to select the stroke of said piston in said cylinder.

18. The apparatus of claim 1, further comprising means for indicating the quantity of additive in said cylinder.

19. The apparatus of claim 18, wherein said indicating means comprises a scale on said cylinder.

20. The apparatus of claim 1, wherein said receiver comprises a conduit and said cylinder comprises first and second supports connecting said conduit with said cylinder, said first channel being provided in said first support and being arranged to convey additive from said cylinder into said conduit.

21. The apparatus of claim 20, wherein said supports are at least substantially identical.

22. The apparatus of claim 20, wherein said piston is movable in said cylinder in a first direction to expel additive from said cylinder into said first channel and in a second direction counter to said first direction, and further comprising a source of pressurized fluid connectable with said conduit, said second support having a passage for admission of pressurized fluid from said source or from said conduit into said cylinder to move said piston in said first direction.

23. The apparatus of claim 22, further comprising an adjustable flow restrictor in said passage.

24. The apparatus of claim 22, wherein said source contains pressurized liquid and further comprising a second source containing a supply of compressed gas and means for connecting said passage with said second source in lieu of with said source of pressurized liquid so that said piston is moved in said first direction by gas which is supplied by said second source.

25. The apparatus of claim 24, further comprising an adjustable flow restrictor provided in said second support and operable to seal said cylinder from said source of pressurized liquid.

26. The apparatus of claim 20, wherein said receiver further comprises a valve and means for connecting said conduit with said valve, said connecting means being provided at said first support.

27. The apparatus of claim 1, further comprising an adjustable flow restrictor in said first channel.

28. The apparatus of claim 1, wherein said receiver comprises a source of cleaning fluid, a shuttle valve, a conduit which connects said shuttle valve with said source, and means for connecting the shuttle valve with a device to be cleaned by the cleaning fluid, said first channel being arranged to admit the additive into said conduit or into said valve.

29. The apparatus of claim 28, wherein said connecting means includes a pipeline having first and second ends connected with said valve for reception of cleaning fluid from said valve, said valve having an outlet for spent cleaning fluid.

30. Apparatus for admitting metered quantities of a flowable additive into a receiver, comprising an elongated cylinder having at least one opening, a first channel, a compartment for additive in communication with said at least one opening and a second opening in communication with said first channel, said openings being spaced apart from each other in the longitudinal direction of said cylinder; an additive-containing vessel; a connector defining a second channel for reception of additive from said vessel and including a sleeve rotatably mounted on said cylinder and surrounding said openings, said connector and said vessel being turnable about a substantially horizontal axis between a first position in which said vessel is located at a first level and said second channel admits additive into said cylinder by way of said at least one opening and a second position in which said vessel is located at a second level below said first level and is sealed from said cylinder, said connector having a third channel connecting said openings in the second position of said connector and said vessel; and means for expelling additive from said cylinder by way of said first channel.

31. The apparatus of claim 30, wherein said sleeve has an internal surface and said third channel includes a groove in said internal surface.

32. The apparatus of claim 30, wherein said second channel registers with said at least one opening in the first position of said connector and said vessel to admit additive into said compartment, said second channel being located substantially diametrically opposite said at least one opening in the second position of said connector and said vessel.

33. Apparatus for admitting metered quantities of a flowable additive into a receiver, comprising an elongated cylinder having at least one opening and a first channel, said first channel including a first section and a second second and said cylinder comprising a support, said second section of said first channel being provided in said support and said cylinder further having an additive-receiving compartment which communicates with said at least one opening; an additive-containing vessel; a connector defining a second channel for reception of additive from said vessel, said connector and said vessel being turnable about a substantially horizontal axis between a first position in which said vessel is located at a first level and said second channel admits additive into said compartment by way of said at least one opening and a second position in which said vessel is located at a second level below said first level and is sealed from said cylinder, said connector having a second opening which communicates with said second channel and admits additive into said compartment by way of said at least one opening in the first position of said connector and said vessel, said connector further having a third opening which communicates with the first section of said channel and is communicatively connected with said at least one opening in the second position of said connector and said vessel, said connector further having an end face and a fourth opening disposed at said end face and communicating with said first section of said first channel, said support sealing said fourth opening in the first position of said connector and said vessel and said support having a fifth opening which communicates with said second section of said first channel and is communicatively connected with said fourth opening in the second position of said connector and said vessel; and means for expelling additive from said cylinder by way of said first channel.

34. The apparatus of claim 33, wherein said at least one opening and said second opening are located substantially diametrically opposite each other in the second position of said connector and said vessel.

35. The apparatus of claim 33, wherein said support has an end face adjacent the end face of said connector and sealing said fourth opening in the first position of said connector and said vessel, said fourth opening being provided in the end face of said connector and said fifth opening being provided in the end face of said support.

36. The apparatus of claim 35, wherein the end face of said connector has a sixth opening which communicates with said second channel and the end face of said support has a seventh opening which communicates with the atmosphere and is communicatively connected with said sixth opening in response to movement of said connector and said vessel from said first position.

* * * * *